(12) United States Patent
Nafarieh et al.

(10) Patent No.: US 8,520,941 B2
(45) Date of Patent: Aug. 27, 2013

(54) METHOD AND SYSTEM FOR DOCUMENT IMAGE CLASSIFICATION

(75) Inventors: Asghar Nafarieh, Menlo Park, CA (US); Alejandro E. Brito, Mountain View, CA (US)

(73) Assignee: Xerox Corporation, Norwalk, CT (US)

(*) Notice: Subject to any disclaimer, the term of this patent is extended or adjusted under 35 U.S.C. 154(b) by 1295 days.

(21) Appl. No.: 12/330,817

(22) Filed: Dec. 9, 2008

(65) Prior Publication Data

US 2010/0142832 A1 Jun. 10, 2010

(51) Int. Cl.
*G06K 9/00* (2006.01)
*G06K 9/34* (2006.01)
*G06K 9/68* (2006.01)

(52) U.S. Cl.
USPC .......................... 382/165; 382/164; 382/218

(58) Field of Classification Search
None
See application file for complete search history.

(56) References Cited

U.S. PATENT DOCUMENTS

| | | | |
|---|---|---|---|
| 5,539,841 A | 7/1996 | Huttenlocher et al. | |
| 6,044,375 A | 3/2000 | Shmueli et al. | |
| 7,020,335 B1 | 3/2006 | Abousleman | |
| 7,292,710 B2 | 11/2007 | Fan et al. | |
| 7,379,587 B2 | 5/2008 | Curry et al. | |
| 7,778,953 B2* | 8/2010 | Fujiwara | 706/62 |
| 2005/0180628 A1* | 8/2005 | Curry et al. | 382/164 |
| 2007/0176000 A1* | 8/2007 | Cattrone et al. | 235/462.01 |
| 2008/0055669 A1* | 3/2008 | Nagarajan et al. | 358/462 |

\* cited by examiner

*Primary Examiner* — David Zarka
*Assistant Examiner* — Ha Le
(74) *Attorney, Agent, or Firm* — Gibb & Riley, LLC

(57) ABSTRACT

A method of classifying an input image includes the initial steps of labeling an input image in accordance with a class and extracting at least one connected component from the input image. The method also includes the steps of calculating at least one feature of the input image and generating a model based on the at least one calculated feature. The method also includes the steps of repeating at least one of the previous steps for at least one other input image and comparing the at least one other input image with the model. The at least one other input image is classified in accordance with the class of the model if the at least one calculated feature of the at least one other input image is substantially similar to that of the model.

17 Claims, 8 Drawing Sheets

METHOD AND SYSTEM FOR DOCUMENT IMAGE CLASSIFICATION

BACKGROUND

1. Technical Field

The present disclosure relates to document classification systems, and, in particular, to a system and method for document image classification based on visual appearance.

2. Description of Related Art

The use of digital input scanners, which can successively scan a set of sheets and record the images thereon as digital data, is common in the office context, such as in digital copiers and electronic archiving. Document categorization is a technique utilized to analyze a scanned document and assign one or more pre-defined category labels to the analyzed document. In this manner, automatic analysis tasks (e.g., indexing, retrieval, sorting, organization) may be tailored to specific document types.

In high volume document scanning scenarios, considerable time and resources are dedicated to visual and/or functional categorization of documents. Typically, a recently-obtained "input image" is compared to a predetermined and preprocessed "reference image" or "training model." In a practical situation, such as in a digital copier or a network printing and copying system, the reference image must be somehow obtained in advance. In a basic case, such as when a user of a digital copier is scanning in what is known to be a set of slides with a uniform template, the user can indicate to the scanning system through a user interface that the first-scanned page image in the set should serve as the reference image in regard to subsequent page images in the set. A variation of this idea would be to have the user cause the scanning system to enter a "training phase" of operation in which a plurality of sheets believed to have a common "template" are scanned in and analyzed using an algorithm to find objects common to all of the sheets. From this training phase of operation, a basic template of common objects can be derived. This basic template of common objects can be used to determine the reference image data.

To make scanned documents searchable, some document classifier engines index electronic documents utilize Optical Character Recognition (OCR) technology. This technique is typically slow (e.g., 1-2 pages per second) for high volume document scanning operation where speed (e.g., 20-30 pages per second) is needed. Further, OCR technology is not capable of recognizing graphical features (e.g., logos, shapes, etc.) within an image document or recognizing image documents of the same category that are represented with different language locales. This shortcoming is exposed in various document classification scenarios such as, for example, wherein images belonging to the same category of document are visually different but are nonetheless labeled the same. During the training phase, most classifier engines combine the computed features of scanned images belonging to the same category to generate training data and/or a training model. This method of generating training data and/or training models contributes to poor accuracy and slow processing during subsequent classification of scanned documents.

SUMMARY

In an embodiment of the present disclosure, a method of classifying an input image includes the initial steps of labeling an input image in accordance with a class and extracting one or more connected components from the input image. The method also includes the steps of calculating one or more features of the input image based on the one or more extracted connected components and generating a model based on the one or more calculated features. The model corresponds to the class of the input image. The method also includes the steps of repeating one or more of the previous steps for one or more other input images and comparing the one or more other input images with the model. The one or more other input images are classified in accordance with the class of the model if the one or more calculated features of the one or more other input images is substantially similar to that of the model.

In another embodiment of the present disclosure, a method of classifying an input image includes the initial steps of labeling an input image in accordance with a class and extracting one or more connected components from the input image. The method also includes the steps of calculating one or more features of the input image based on the one or more extracted connected components and repeating one or more of the previous steps for one or more other input images. The method also includes the steps of clustering input images of the same class into a sub-class and aggregating the one or more calculated features of the clustered input images of the sub-class. The method also includes the steps of generating a model of the sub-class based on the one or more aggregated features of the clustered input images. An input image having one or more calculated features substantially similar to the aggregated features of the model is classified in accordance with the class of the clustered input images of the sub-class.

In another embodiment of the present disclosure, a method of classifying an input image includes the initial steps of bounding one or more targets of an input image and labeling the bounded target(s) in accordance with a class of the input image. The method also includes the steps of extracting one or more connected components from the bounded target(s) and calculating one or more features of the bounded target(s) based on the extracted connected component(s). The method also includes the step of generating a model of the bounded target(s) based on the calculated feature(s). The model is labeled in accordance with the class of the input image to which the label of the bounded target(s) corresponds. The method also includes the steps of extracting one or more connected components from one or more other input images and calculating one or more features of the other input image(s) based on the extracted connected component(s). The method also includes the step of comparing the other input image(s) with the model. The other input image(s) is labeled in accordance with the class of the model if the calculated feature(s) of the other input image(s) is substantially similar to that of the model.

BRIEF DESCRIPTION OF THE DRAWINGS

These and other advantages will become more apparent from the following detailed description of the various embodiments of the present disclosure with reference to the drawings wherein.

DETAILED DESCRIPTION

Figure 1:
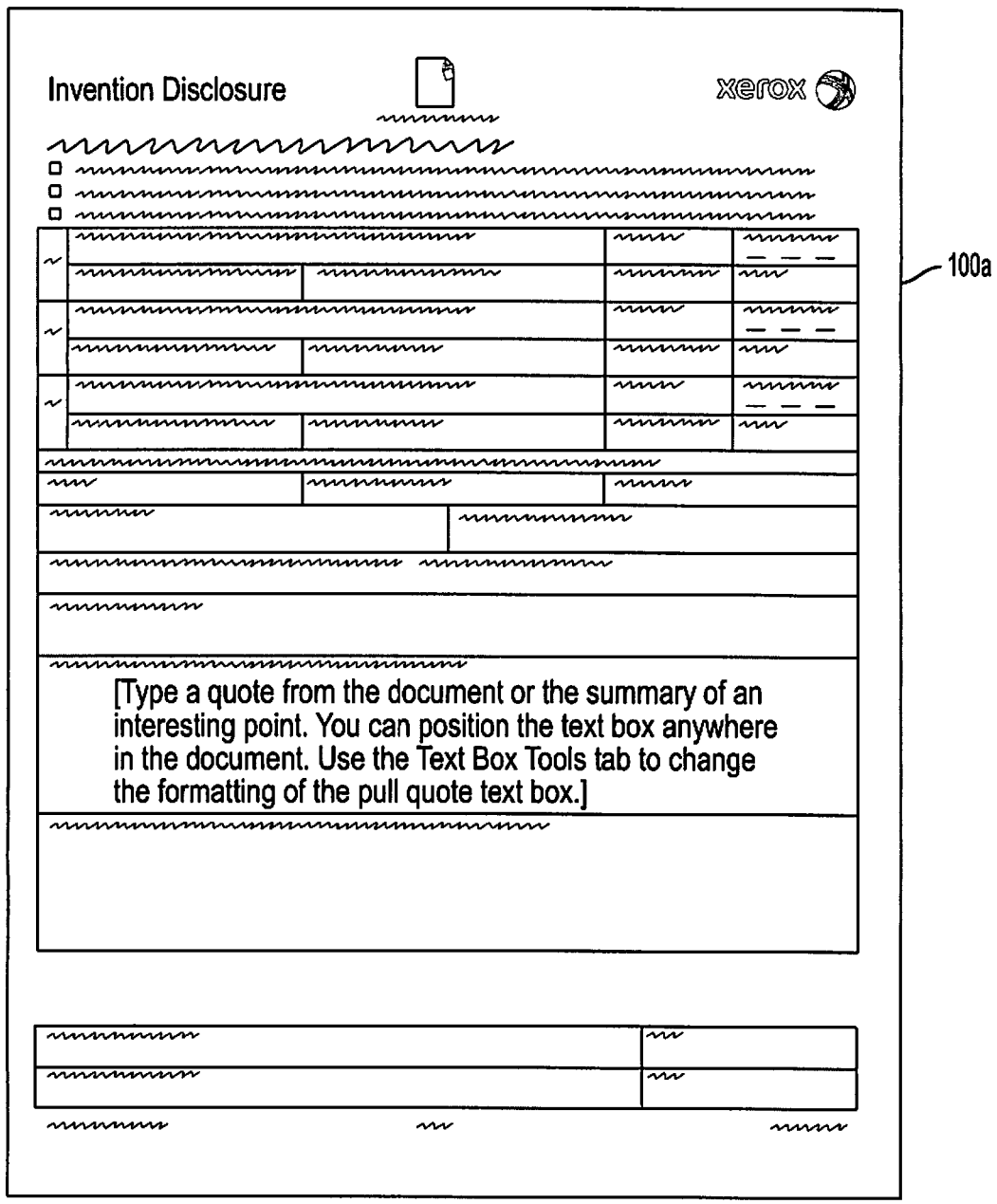
FIGS. 1 and 2 show example images to illustrate the operation of an embodiment of the present disclosure.

Embodiments of the presently disclosed image categorization system and method will now be described in detail with reference to the drawings in which like reference numerals designate identical or corresponding elements in each of the several views.

The present disclosure relates to the image based analysis of scanned images to classify document types. In embodiments of the present disclosure, attributes or features of input images are automatically learned by an image classification engine ("ICE") through use of an efficient connected component analysis to generate training data or training models ("models"). Other scanned input images are compared with the models and classified based on the comparison. The ICE is a fast multi-facet machine learning classifier that is configured to classify documents based on visual appearance. The ability to classify documents based on visual appearance negates the need for optical character recognition ("OCR"). Once a model is generated through use of methods embodied by the present disclosure (see FIGS. 3A and 6), the ICE may utilize any suitable probabilistic classification model (e.g., Naive Bayes) or support vector machine to classify documents based on comparisons between input documents and the model.

Connected component analysis is an image analysis algorithm utilized to group pixels of a scanned image into components based on pixel connectivity. More specifically, all pixels included within a connected component share substantially similar pixel intensity values (e.g., gray level, color, etc.). In one embodiment, particular features of scanned images are calculated by the ICE utilizing a fast and efficient connected component analysis, such as the analysis described in commonly-owned U.S. Pat. No. 7,379,587, the disclosure of which is incorporated herein by reference in its entirety. Scanned images sharing substantially similar calculated features (e.g., images of the same "class") are clustered into subsets based on these similarities. Clustering is the classification of objects into different groups, or more precisely, the partitioning of a data set into subsets (clusters), so that the data in each subset share some common trait (e.g., proximity according to some defined distance measure). Based on the aggregate calculated features of the clustered data (e.g., the re-labeled subsets), a model is generated, as will be discussed in further detail below. This automatic clustering of image data facilitates the unique implementation of the ICE as a fast and efficient technique for calculating connected components.

In another embodiment, particular features of one or more specific targets of a scanned image are calculated by the ICE utilizing connected component analysis. A target may be any graphical feature of the scanned image such as, for example, a barcode, a shape, or a logo. Based on the calculated features of the specific target, a model is generated, as will be discussed in further detail below. This target spotting technique for detecting unique features (e.g., barcodes) within documents is implemented by the ICE as a fast and efficient technique for calculating connected components.

Each of the above described techniques for calculating connected components quickly and efficiently, allow the ICE to be implemented with a small memory footprint relative to conventional categorization techniques.

Figure 2:
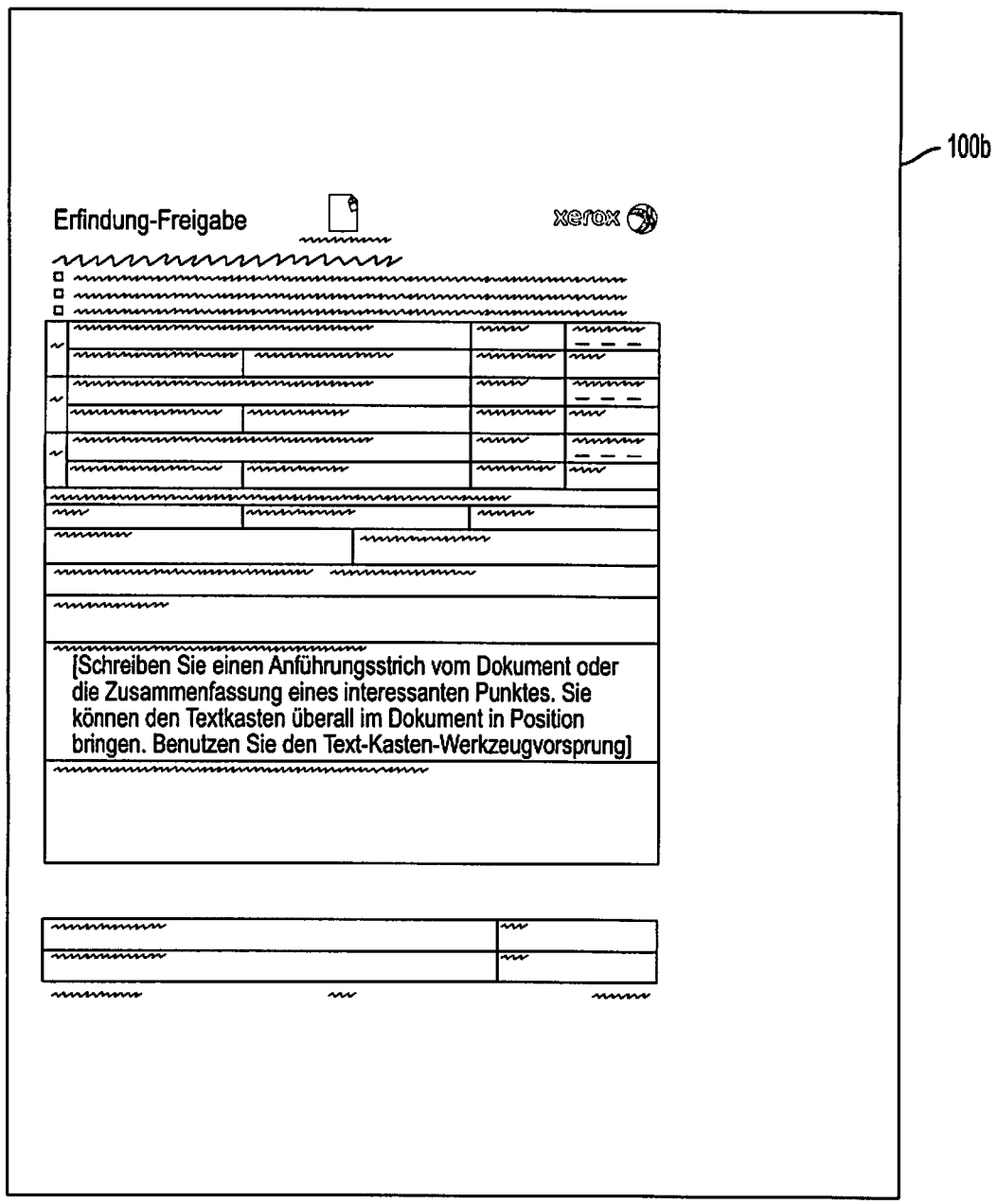

In one scenario illustrated by FIGS. 1 and 2, documents that are vastly different in appearance may, nonetheless, belong to the same class of images (e.g., prescriptions). Absent user intervention, existing classification models would fail to automatically recognize such visually different images as belonging to the same class. As such, images in this scenario must be manually labeled as belonging to the same class to generate the corresponding models. Further, the documents illustrated in FIGS. 1 and 2 are represented by different language locales, namely, English and German, respectively. Although OCR would recognize the characters in each of the images of FIGS. 1 and 2, the differences in textual content would prevent OCR from recognizing these images as belonging to the same class of document.

Figure 4:
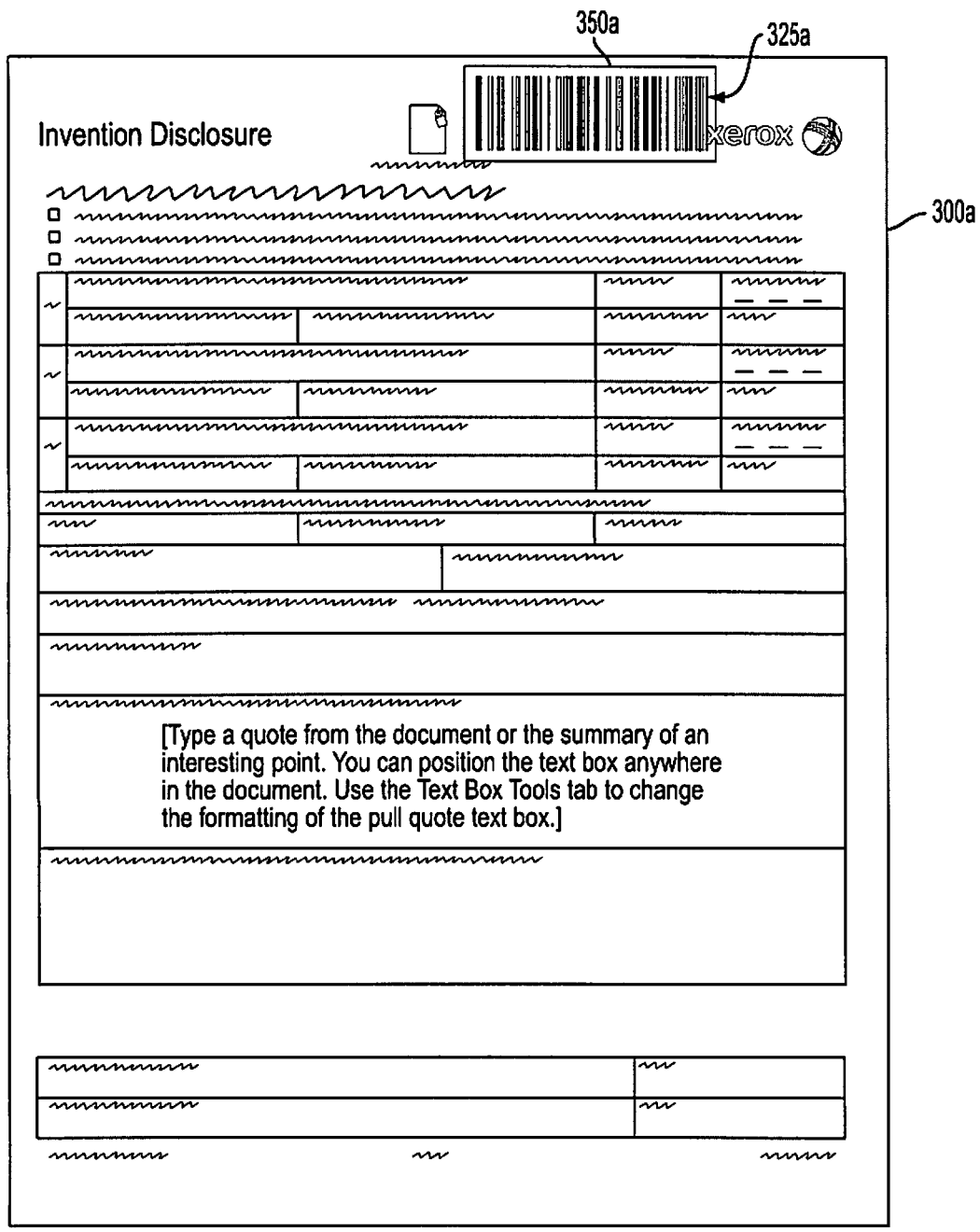
FIGS. 4 and 5 show example images to illustrate the operation of an embodiment of the present disclosure.
Figure 5:
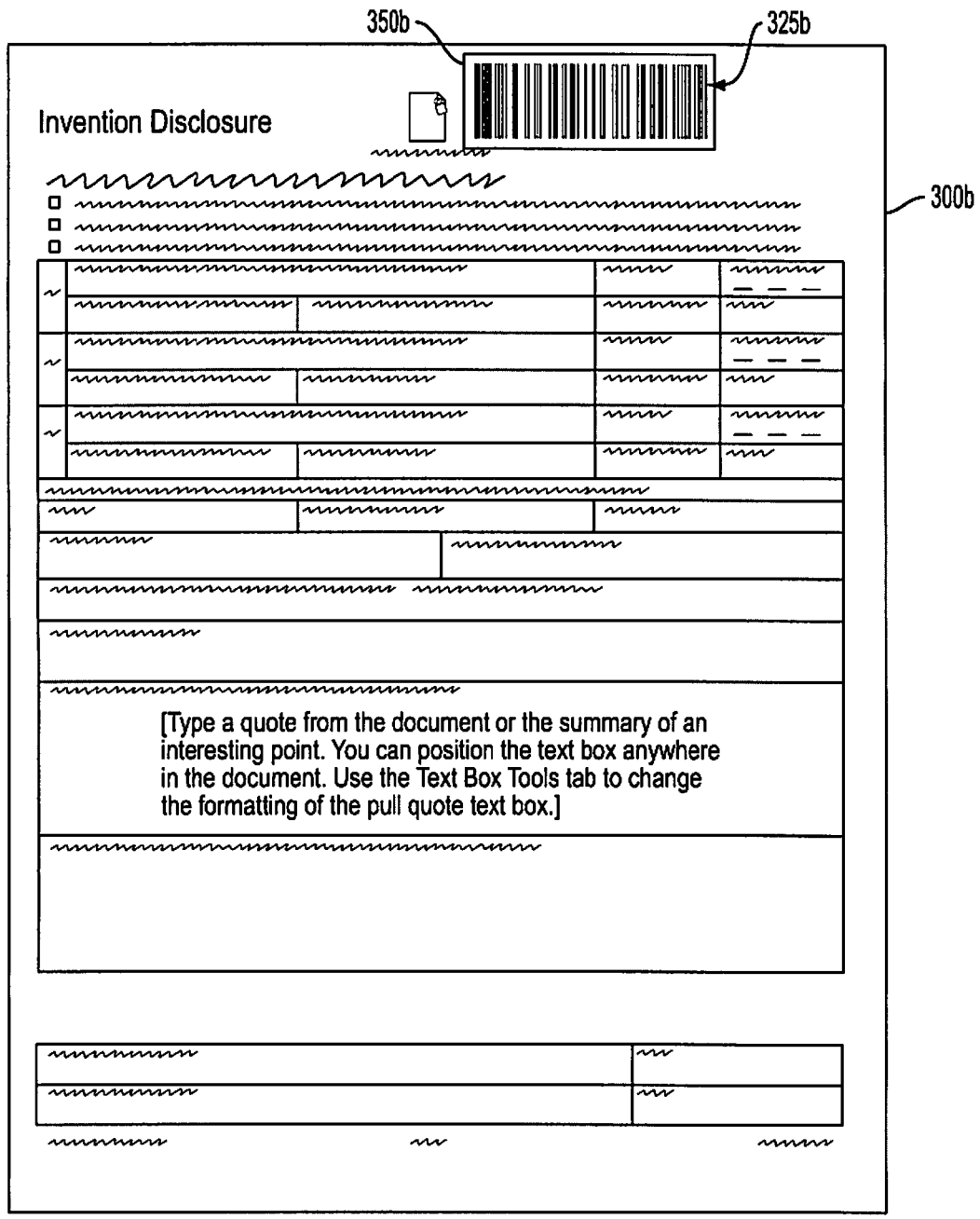

In another scenario illustrated by FIGS. 4 and 5, documents may have substantially similar visual features that available classification engines and/or methods may not have the capacity to differentiate. That is, images may have only slight variations that existing classification engines fail to recognize and, as a result, undesirably classify these images as belonging to the same class.

As discussed above, the ICE utilizes connected component analysis to generate a model for purposes of classifying documents in various scenarios, such as the scenarios discussed above. More specifically, the ICE may operate in various modes or phases including a so-called "training" phase, wherein the ICE automatically learns the attributes or features of input images to generate a corresponding model, discussed in further detail below. The ICE may also operate in a so-called "classification" phase, wherein the ICE matches attributes or features of input images with a model to classify the input images in accordance with the classification of the matching model. In use, the ICE may operate in the training phase and classification phase concurrently or operate in either one of the training phase and classification phase independently.

FIGS. 1 and 2 illustrate two page images 100a and 100b that, despite being substantially visually different, belong to the same category or class of document. As can be seen, page images 100a and 100b differ in certain details, such as the size and location of the graphics and the language of the text (e.g., FIG. 1 includes text represented in English and FIG. 2 includes text represented in German). The scenario presented by the comparison between page images 100a and 100b illustrates how technologies used by existing or conventional classification engines, such as OCR, do not have the capacity or complexity to classify documents based on textual content. For example, two or more documents of the same class (e.g., page images 100a and 100b) may each include text that is different in content (e.g., different language of text) relative to the other document(s) and, thus, will not be classifiable based on textual content by OCR. Further, documents that include only graphical images (i.e., no characters) or no images at all (e.g., a blank document) do not include any data (e.g., characters) that is recognizable, much less classifiable, by OCR technology. By way of example, either one of page images 100a and 100b may be comprised entirely of one or more graphical images (not explicitly shown) without any characters. In this scenario, OCR would fail to recognize any features of the page images, illustrating yet another scenario in which OCR lacks the complexity to classify documents.

Figure 3A:
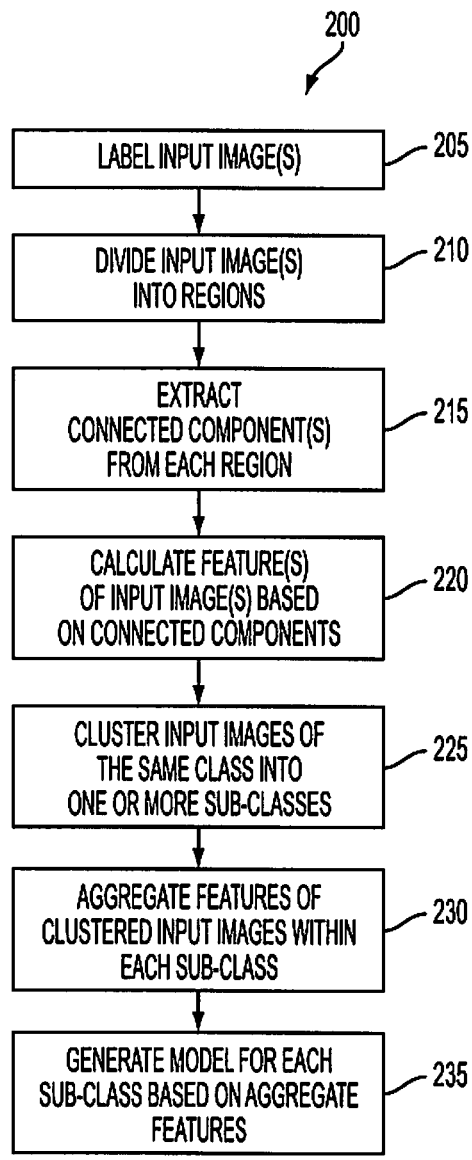
FIG. 3A is a flow chart diagram illustrating a method for generating a model based on scanned image documents in accordance with an embodiment of the present disclosure.

FIG. 3A is a simplified flowchart illustrating a method 200 by which the ICE generates a model according to an embodiment of the present disclosure. For purposes of discussion, method 200 will be discussed in reference to page images 100a and 100b of FIGS. 1 and 2, respectively, however, it should be appreciated that method 200 may be employed to generate models in various scenarios wherein respective data from two or more images is compared.

With reference to the scenario illustrated by FIGS. 1 and 2, by way of example, the ICE calculates features of an input image (e.g., via connected component analysis) received through, for example, a digital input scanner as part of a digital copier (not explicitly shown) and suitably processed (e.g., segmented, analyzed, converted to a known format, etc.). The digital copier may include several components, including a processor, memory (e.g., RAM), a hard disk drive, a USB interface, a network interface, a display/monitor, and/ or other components. In embodiments, the ICE may be a software application stored in the memory of the copier and executable by the processor of the copier. The ICE may be implemented through an application programming interface (API). The API implementation provides the ability to invoke methods and/or software applications (e.g., the ICE) that reside on another computer system.

Figure 3B:
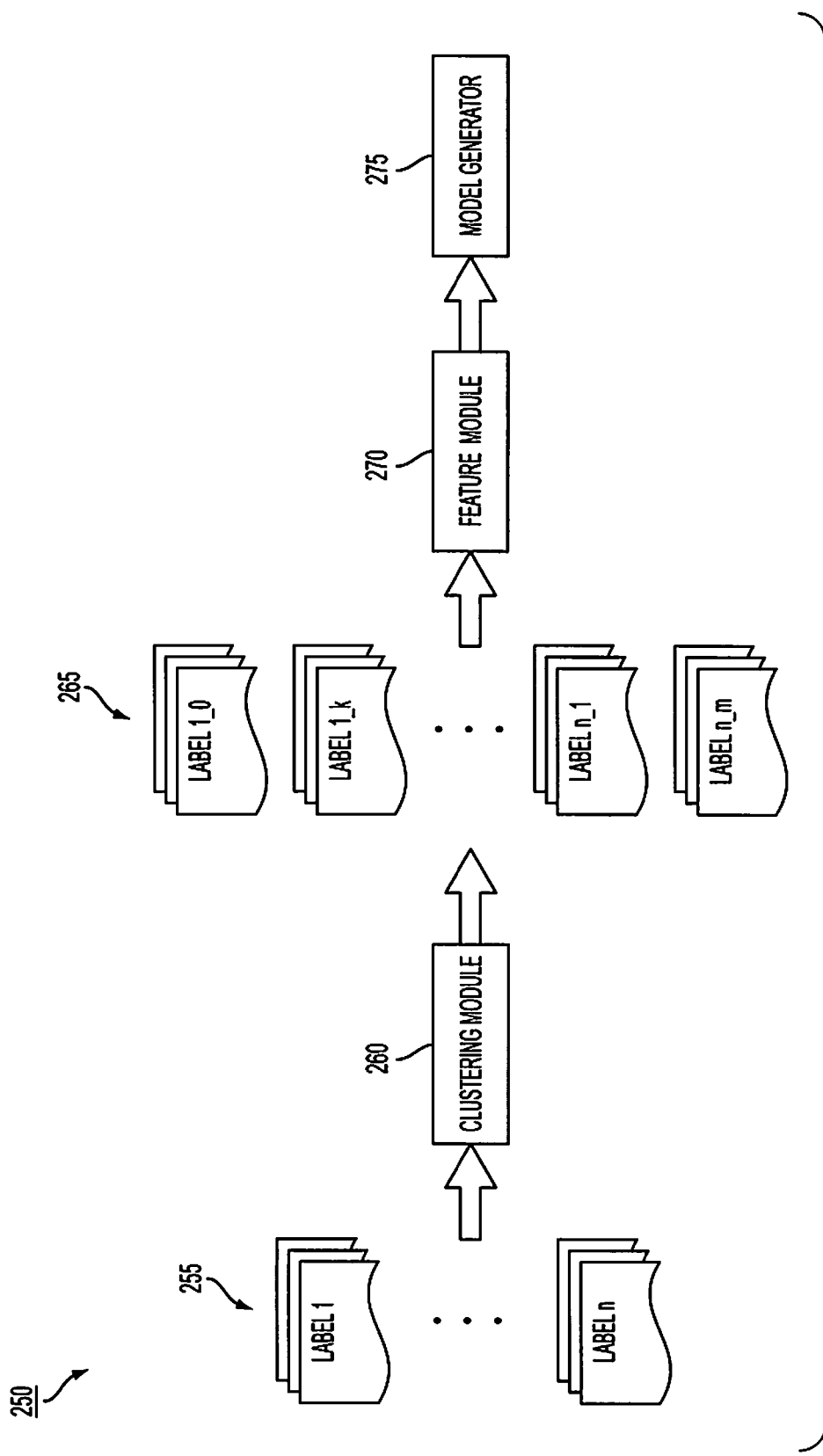
FIG. 3B is a flow chart diagram illustrating a method for generating a model in accordance with an embodiment of the present disclosure.

In an initial step 205 of method 200, an input image is labeled in accordance with a class, as will be discussed in detail below with reference to FIG. 3B. In step 210, the input image is divided into a plurality of regions (e.g., 128 pixels× 128 pixels). In step 215, the ICE extracts one or more connected components from each of the plurality of regions of the input image. In step 220, one or more features for each of the plurality of regions of the input image is calculated based on the one or more connected components extracted in step 215. The one or more features calculated may include, for example without limitation, the quantity of connected components within a region (e.g., the number of individual components within each region, the pixels of each of which share substantially similar intensity values), the pixel population (e.g., number of ON pixels) within each connected component (e.g., the number of pixels that share substantially similar intensity values within a connected component), the relative location of each connected component within a region (e.g., the x and y coordinates of each connected component within the region), and the dimensions of a so-called "bounding box" (discussed in further detail below) bounding each component (e.g., x, y, width, height).

Returning to the above mentioned scenario illustrated by FIGS. 1 and 2, input images that are substantially visually different may, nonetheless, be of the same category or class of document. In this scenario, the ICE clusters each of such input images into a sub-class of the common root class, in step 225. Each clustered image of a particular class is re-classified or re-labeled in accordance with one of any number of sub-classes of the root class, as will be discussed in further detail below with reference to FIG. 3B. In step 230, for each sub-class of a root class, the calculated features of each and every image within a sub-class are aggregated. In embodiments, the mean and standard deviation of the calculated features of each region of each image in a particular sub-class are calculated and the resulting calculation is utilized to generate the model for that particular sub-class. In step 235, a model is generated for each sub-class based on the aggregate features of the clustered image(s) of that sub-class. In embodiments, the model of a sub-class is stored within a model file corresponding to the root class of the sub-class within the memory of a digital copier. That is, each sub-class clustered from the same root class of input images includes a unique model that corresponds to or points to that class of input images as a common root class. Input images sharing one or more respective calculated features with the model of a particular sub-class are classified in accordance with the label of the root class to which that particular sub-class points. The ICE is a self-learning application that accumulates a "knowledge-base" of training data with each model generated.

With reference to the scenario illustrated by FIGS. 1 and 2 and described above, FIG. 3B illustrates, by way of example, a method 250 by which the ICE clusters one or more input images 255. The ICE includes a clustering module 260, a feature module 270, and a model generator 275. The clustering module 260 clusters input images 255 belonging to the same class (e.g., Label 1) into one or more sub-classes (e.g., Label 1_0, Label 1_k). As shown in FIG. 3B, by way of example, Label 1_k represents a sub-class, "k," of root class "1." Each sub-class includes one or more clustered images 265 that share one or more calculated features. Each sub-class may include, at minimum, one clustered image 265 and, at maximum, n clustered images 265 wherein n represents the number of input images 255 clustered by the clustering module 260. The feature module 270 aggregates the calculated features from each and every clustered image 265 within a sub-class. Based on the aggregated features for a particular sub-class, the model generator 275 generates a unique model corresponding to that sub-class. More specifically, the generated model corresponding to a particular sub-class is based upon the aggregate features of the clustered image(s) 265 of that sub-class. In embodiments, the aggregate features for a particular sub-class may correspond to the mean and standard deviation of the calculated features from each and every clustered image 265 of a particular sub-class. The generated model is compared with subsequent input images for purposes of document classification of the input image.

To classify an input image (e.g., 100a and/or 100b) in the scenario illustrated by FIGS. 1 and 2, a suitable method such as, for example, a maximum likelihood estimation, is utilized to match or fit the calculated features of the input image to a model corresponding to a class or sub-class. Upon a successful match or fit with a model corresponding to a particular sub-class, the label or classification returned or generated corresponds to the root class to which that particular sub-class points. In a practical scenario, a digital copier may operate in a so-called "classification" phase (that corresponds to the classification phase of the ICE) wherein input images are scanned and analyzed to calculate one or more features, as described above with reference to method 200, for purposes of comparison to models stored within the memory of a digital copier. Upon classification of an input image or failure to classify an input image, the ICE may provide a suitable indication (e.g., via a user interface of the digital copier) of the resulting classification of the input image or resulting failure to classify the input image.

FIGS. 4 and 5 illustrate two substantially similar page images 300a and 300b that may belong to different classes. As can be seen, the page images 300a and 300b include only slight differences in details relative to each other, such as barcode stamps 325a and 325b, respectively. Each barcode stamp 325a and 325b is shown encompassed by a zone 350a and 350b, respectively, superimposed on the images 300a and 300b, respectively. Further, page image 300b does not include the logo included on the top right corner of page image 300a. Absent user intervention, existing classification models would classify page images 300a and 300b as belonging to the same class due to a failure to detect the slight variations between the images.

Figure 6:
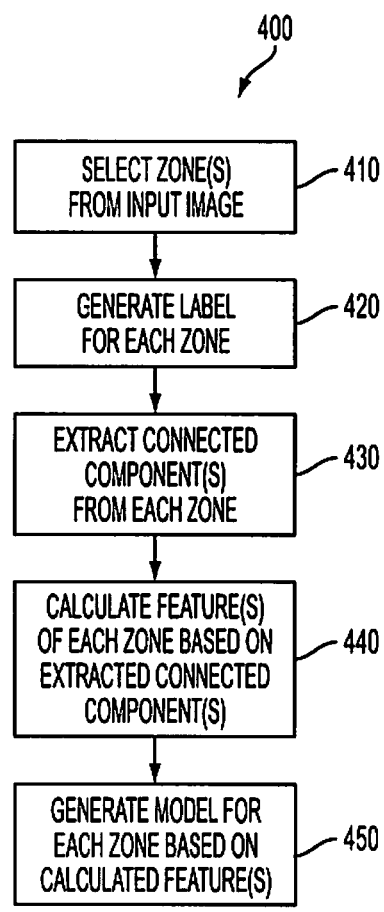
FIG. 6 is a flow chart diagram illustrating a method for generating a model based on scanned image documents in accordance with an embodiment of the present disclosure.

FIG. 6 is a simplified flowchart illustrating a method 400 by which the ICE generates training models according to another embodiment of the present disclosure. For purposes of discussion, method 400 will be discussed in reference to page images 300*a* and 300*b* of FIGS. 4 and 5, respectively, however, it should be appreciated that method 400 may be employed to generate training models in various scenarios wherein respective data from two or more images is compared.

With reference to the scenario illustrated by FIGS. 4 and 5, by way of example, the ICE calculates features of an input image (e.g., via connected component analysis) received through, for example, a digital input scanner as part of a digital copier and suitably processed (e.g., segmented, analyzed, converted to a known format, etc.). In an initial step 410 of method 400, one or more zones (e.g., zones 350*a*, 350*b*) of an input image are selected (e.g., zones may be selected by a user of a printing device during the training phase of the ICE). More specifically, zones may be selected to target features or properties of an input image which differentiate that image from images belonging to a different class or, stated differently, features or properties that define an input image as belonging to a particular class (e.g., a distinguishing feature). With reference to FIGS. 4 and 5, each zone 350*a* and 350*b* may be embodied as a bounding box of a general type known in image processing to isolate smaller images of a single identifiable type, called objects, within a large image. In this scenario, zones 350*a*, 350*b* may be the smallest possible rectangle (having dimensions along the x and y directions of the large image) that encompasses or bounds an object. The number of objects found in an image may vary depending on a particular segmenting technique or filtering technique.

In step 420, each zone selected from a particular input image is labeled in accordance with a class of images to which that particular input image belongs. That is, zones selected from the same input image share the same label. In this manner, each input image includes a single label representative of the class of images to which the input image belongs. In a practical scenario, the label selected for the one or more zones of an input image may be selected by a user through use of a digital copier (e.g., via a user interface) during a training phase of the ICE.

In step 430, one or more connected components are extracted from the selected zone(s) of the input image selected in step 420. In step 440, one or more features of the selected zone(s) are calculated based on the connected component(s) extracted from that zone. The one or more features calculated may include, for example without limitation, the size of each extracted connected component (e.g., the surface area of a zone occupied by the pixels included within a connected component), the pixel population (e.g., number of ON pixels) within each extracted connected component, the relative location of each extracted connected component within a zone (e.g., the x and y coordinates of each connected component within the region), and the normalized shape histogram or distribution of tones for each side of each extracted connected component (e.g., left, right, top, bottom).

In step 450, for each zone selected for an input image, the ICE generates a model based on the one or more features calculated in step 440. Each model generated is labeled in accordance with the label selected for the zone on which the model is based. In this way, for each zone selected from a particular input image, a model is generated to represent the class of images to which that input image belongs. The model of a particular zone is based on the one or more features calculated for that selected zone. Based on the features calculated, the ICE may learn a specific sequence of the target bounded by the zone. A barcode, for example, may include a specific sequence of shapes or figures spaced in a specific relation relative to each other. This specific sequence may be compared to calculated features of subsequently input images for purposes of classification, as will be discussed in further detail below.

To classify an input image (e.g., 300*a* and/or 300*b*) in the scenario illustrated by FIGS. 4 and 5, one or more features of the entire input image are calculated and compared to the one or more models generated in step 450 of method 400. More specifically, one or more connected components are extracted from the entire input image to be classified. Based on the one or more connected components extracted, one or more features of the input image to be classified are calculated. In this scenario, the calculated features of the entire input image are analyzed by the ICE to detect certain sequences of features and/or shapes (e.g., a barcode) for comparison to the calculated features of the selected zone corresponding to one or more models generated in step 450 of method 400. That is, if an input image shares a particular sequence of features with the selected zone corresponding to a model (e.g., the zone selected during the training phase of the ICE), the input image is classified in accordance with the model. Because a particular sequence of features (e.g., barcode, logo, etc.) may be located anywhere on the input image to be classified and is not restricted to the relative location of a selected zone corresponding to a particular generated model, connected components are calculated across the entire input image to detect any possible sequences that may match the features or sequence of the zone corresponding to a generated model. The above described matching technique ensures accurate matching of input images with a model (e.g., during a classification phase of the ICE) during the scenario presented by the comparison of two or more images (e.g., page images 300*a* and 300*b*) that include only slight variations relative to each other. For example, the barcode 325*b* on page image 300*b* of FIG. 5 is slightly different than the barcode 325*a* on page image 300*a* of FIG. 4. More specifically, the spacing of the shapes comprising barcode 325*b* relative to each other is not the same as that of barcode 325*a*. Applying the above described matching technique, in this scenario, would result in page images 300*a* and 300*b* being classified differently based on a comparison to each other or to a comparison to one or more models.

Upon a successful match between the one or more calculated features or detected sequence of the input image to be classified and the one or more calculated features corresponding to a particular model, the label or classification returned corresponds to the class of input images that the matching model represents. In a practical scenario, a digital copier may operate in a so-called "classification" phase (that corresponds to the classification phase of the ICE) wherein input images are scanned and analyzed to calculate one or more features, as described above, for purposes of comparison to models stored within the memory of a digital copier. Upon classification of the input image, a digital copier may provide a suitable indication (e.g., via a user interface of the digital copier) of the resulting classification of the input image or resulting failure to classify the input image.

Figure 7:
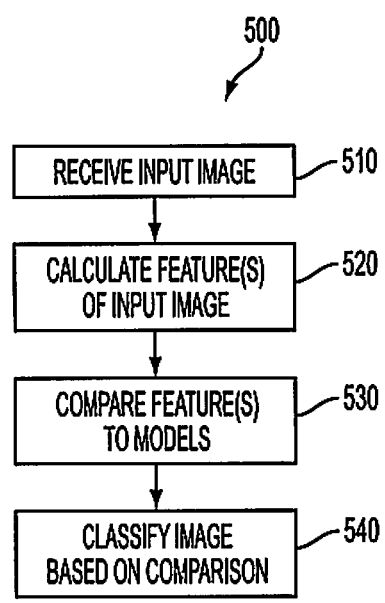
FIG. 7 is a flow chart diagram illustrating a method for classifying an image according to an embodiment of the present disclosure.

FIG. 7 illustrates a method 500 for classifying documents utilizing training data or training models generated by the ICE (e.g., via method 200 and/or method 400). More specifically, in step 510, an input image is received by an input of a suitable scanning device. In step 520, the ICE calculates one or more features (e.g., via connected component analysis) of the input image (e.g., 100*a*, 100*b*, 300*a*, 300*b*). In step 530, the one or more features calculated in step 520 are compared to a preprocessed model (e.g., generated via method 200 and/or method 400). Upon a successful match between the calculated feature(s) of the input image to be classified and the one or more features corresponding to a particular model, the label or classification returned, in step 540, corresponds to the class of images that the matching model represents. In embodiments, methods 200 and 400 may be executed concurrently or independently relative to each other to generate a model.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of classifying an input image, comprising:
   labeling a first input image in accordance with a class, using an image classification engine having a processor;
   bounding at least one target of said first input image, using said processor;
   extracting at least one connected component from said first input image, using said processor, said at least one connected component being extracted from said at least one target of said first input image that has been bounded;
   calculating at least one feature of said first input image based on said at least one connected component extracted from said first input image, using said processor, said at least one feature being calculated based on at least one of: a size of said at least one connected component, relative location of said at least one connected component within said at least one target, and a normalized shape histogram of said at least one connected component within said at least one target;
   generating a model based on said at least one feature calculated from said first input image, using said processor, said model corresponding to said class of said first input image;
   extracting at least one connected component from at least one other input image, using said processor;
   calculating at least one feature of said at least one other input image based on said at least one connected component extracted from said at least one other input image, using said processor;
   comparing said at least one feature of said at least one other input image with features of said model, using said processor;
   classifying said at least one other input image in accordance with said class of said model based on said at least one feature of said at least one other input image being substantially similar to a feature of said model, using said processor;
   clustering input images of a same class into one of at least one sub-class, using said processor;
   aggregating said at least one feature of each of said input images of said sub-class into at least one aggregated feature, using said processor; and
   generating a sub-model corresponding to said sub-class, using said processor, said sub-model being based on said at least one aggregated feature of said sub-class, an input image having at least one feature substantially similar to said at least one aggregated feature of said sub-model being classified in accordance with said class of said at least one input image of said sub-class.

2. A method according to claim 1, further comprising:
   dividing said first input image into a plurality of regions prior to said extracting at least one connected component from said first input image, using said processor, said at least one connected component being extracted from at least one of said plurality of regions of said first input image.

3. A method according to claim 2, said at least one feature being calculated based on at least one of: a quantity of connected components within at least one of said plurality of regions, a pixel population within said at least one connected component, a relative location of said at least one connected component within at least one of said plurality of regions, and a bounding box bounding said at least one connected component.

4. A method according to claim 1, said at least one target being bounded by a user-selected bounding box superimposed on said first input image.

5. A method according to claim 1, further comprising:
   inputting said first input image via a digital input scanner operably coupled with a digital copier.

6. A method according to claim 1, further comprising:
   providing an image classification software engine configured to operate in at least one of a training phase to generate said model, and a classification phase to classify said at least one other input image.

7. A method according to claim 1, at least one of said first input image and said at least one other input image comprising at least one graphical image.

8. A method of classifying an input image, comprising:
   labeling a first input image in accordance with a class using an image classification engine having at least one processor;
   bounding at least one target of said first input image, using said at least one processor;
   extracting at least one connected component from said first input image, using said at least one processor, said at least one connected component being extracted from said at least one target of said first input image that has been bounded;
   calculating at least one feature of said first input image based on said at least one connected component extracted from said first input image, using said at least one processor, said at least one feature being calculated based on at least one of: a size of said at least one connected component, relative location of said at least one connected component within said at least one target, and a normalized shape histogram of said at least one connected component within said at least one target;
   extracting at least one connected component from at least one other input image, using said at least one processor;
   calculating at least one feature of said at least one other input image based on said at least one connected component extracted from said at least one other input image, using said at least one processor;
   clustering input images of a same class into one of at least one sub-class, using said at least one processor;
   aggregating said at least one feature of each of said at least one input image of said sub-class into at least one aggregated feature, using said at least one processor; and
   generating a model of said sub-class based on said at least one aggregated feature, using said at least one processor, an input image having at least one feature substantially similar to said at least one aggregated feature of said model being classified in accordance with said class of said at least one input image of said sub-class.

9. A method according to claim 8, further comprising:
   dividing said first input image into a plurality of regions, using said at least one processor, prior to said extracting at least one connected component from said first input image, said at least one connected component being extracted from at least one of said plurality of regions of said first input image.

10. A method according to claim 9, said at least one feature being calculated based on at least one of: a quantity of connected components within at least one of said plurality of regions, a pixel population within said at least one connected component, a relative location of said at least one connected component within at least one of said plurality of regions, and a bounding box bounding said at least one connected component.

11. A method according to claim 8, further comprising:
providing an image classification software engine configured to operate in at least one of a training phase to generate said model, and a classification phase to classify said at least one other input image.

12. A method according to claim 11, further comprising:
implementing said image classification software engine via an application programming interface.

13. A computer implemented method of classifying an input image, comprising:
bounding at least one target of at least one input image by a user-selected bounding box superimposed on said at least one input image, using a computerized device;
labeling said at least one target in accordance with a class of said at least one input image, using said computerized device;
extracting at least one connected component from said at least one target, using said computerized device, said at least one connected component being extracted from said at least one target of said at least one input image that has been bounded;
calculating at least one feature of said at least one target based on said at least one connected component extracted from said at least one target, using said computerized device, said at least one feature being calculated based on at least one of: a size of said at least one connected component, relative location of said at least one connected component within said at least one target, and a normalized shape histogram of said at least one connected component within said at least one target;
generating a model of said at least one target based on said at least one feature, and labeling said model in accordance with said class of said at least one target, using said computerized device;
extracting at least one connected component from at least one other input image, using said computerized device;
calculating at least one feature of said at least one other input image based on said at least one connected component extracted from said at least one other input image, using said computerized device, said at least one feature of said at least one other input image being calculated based on at least one of: a size of said at least one connected component of said at least one other input image, relative location of said at least one connected component of said at least one other input image within said at least one target, and a normalized shape histogram of said at least one connected component of said at least one other input image within said at least one target;
comparing said at least one feature of said at least one other input image with features of said model, using said computerized device, said at least one other input image being classified in accordance with said class of said model based on said at least one feature of said at least one other input image being substantially similar to a feature of said model;
clustering input images of a same class into one of at least one sub-class, using said computerized device;
aggregating said at least one feature of each of said input images of said sub-class into at least one aggregated feature, using said computerized device; and
generating a sub-model corresponding to said sub-class, using said computerized device, said sub-model being based on said at least one aggregated feature of said sub-class, an input image having at least one feature substantially similar to said at least one aggregated feature of said sub-model being classified in accordance with said class of said at least one input image of said sub-class.

14. A method according to claim 13, said at least one feature of said at least one other input image comprising a sequence of features in spaced relation to each other.

15. A method according to claim 14, said at least one feature of said at least one other input image being substantially similar to said model based on said sequence of features of said at least one other input image matching a corresponding sequence of features of said model.

16. A method according to claim 15, said sequence of features comprising at least one of a barcode, a logo, and a shape.

17. A method according to claim 13, further comprising:
dividing said at least one input image into a plurality of regions, using said computerized device,
said at least one feature being calculated based on at least one of: a quantity of connected components within at least one of said plurality of regions, a pixel population within said at least one connected component, a relative location of said at least one connected component within said at least one of said plurality of regions, and said user-selected bounding box bounding said at least one connected component.

* * * * *